United States Patent
Shih et al.

(10) Patent No.: US 8,937,655 B2
(45) Date of Patent: Jan. 20, 2015

(54) SYSTEM FOR ALIGNING AND ATTACHING A 3D IMAGE DISPLAY AND METHOD FOR POSITIONING A PHASE RETARDER SUBSTRATE

(75) Inventors: Mei-Sha Shih, Kaohsiung (TW); Chun-Wei Su, Taipei (TW); Jan-Tien Lien, Keelung (TW)

(73) Assignee: Chunghwa Picture Tubes, Ltd., Taoyuan (TW)

(*) Notice: Subject to any disclaimer, the term of this patent is extended or adjusted under 35 U.S.C. 154(b) by 348 days.

(21) Appl. No.: 13/595,173

(22) Filed: Aug. 27, 2012

(65) Prior Publication Data
US 2013/0235184 A1    Sep. 12, 2013

(30) Foreign Application Priority Data
Mar. 6, 2012   (TW) .............................. 101107441 A

(51) Int. Cl.
*H04N 7/18*    (2006.01)
*H04N 13/02*   (2006.01)
*H04N 13/04*   (2006.01)

(52) U.S. Cl.
USPC .................................. 348/95; 348/47; 348/51

(58) Field of Classification Search
CPC ...... G02B 27/26; G02B 5/3083; G02B 7/003; G02B 27/2214; H04N 7/18; H04N 13/0239; H04N 13/0055; H04N 13/0059; H04N 13/0242; H04N 13/0081; H04N 13/0048; H01L 21/681; G01B 11/00; G06T 7/0022
USPC ........ 348/94, 95, 42, 46–48, 51, 52; 345/653, 345/664, 679; 359/462, 465; 353/7; 356/12; 396/324, 325
IPC ......................... H04N 7/18,13/00, 13/02, 13/04
See application file for complete search history.

(56) References Cited

U.S. PATENT DOCUMENTS

| 6,947,215 B2 * | 9/2005 | Hoshi ........................ 359/576 |
| 2004/0012851 A1 | 1/2004 | Sato et al. |
| 2009/0310216 A1 | 12/2009 | Roh et al. |

FOREIGN PATENT DOCUMENTS

TW          201107730          3/2011

* cited by examiner

*Primary Examiner* — Sherrie Hsia
(74) *Attorney, Agent, or Firm* — WPAT, PC; Justin King

(57) ABSTRACT

A method for positioning a phase retarder substrate includes the following steps. A phase retarder substrate is provided, wherein the phase retarder substrate includes a first align mark which includes a patterned phase retarder film. An image capturing unit is disposed at one side of the phase retarder substrate. A light source is disposed at the other side of the phase retarder substrate. An upper polarizing sheet is disposed between the image capturing unit and the patterned phase retarder film, and a lower polarizing sheet is disposed between the light source and the patterned phase retarder film. An image of the light which passes through the lower polarizing sheet, the patterned phase retarder film and the upper polarizing sheet is captured so as to position the phase retarder substrate.

10 Claims, 9 Drawing Sheets

SYSTEM FOR ALIGNING AND ATTACHING A 3D IMAGE DISPLAY AND METHOD FOR POSITIONING A PHASE RETARDER SUBSTRATE

CROSS-REFERENCE TO RELATED APPLICATION

This application claims the benefit of Taiwan Patent Application No. 101107441, filed on Mar. 6, 2012, which is hereby incorporated by reference for all purposes as if fully set forth herein.

BACKGROUND OF THE INVENTION

1. Field of Invention

This invention relates to an aligning/attaching system for a three dimension (3D) image display device and, and more particularly to an aligning/attaching system for a 3D image display device and a transmissive type method for positioning a phase retarder substrate.

2. Related Art

A conventional 3D image display device includes a phase retarder substrate which is attached to a liquid crystal display panel so as to generate a 3D image. The conventional 3D image display device utilises a patterned phase retarder film of the phase retarder substrate, which is electroplated with a reflection layer so as to form an align mark. The reflection and phase retardation of a light are used, and the polarization of a polarizing sheet is cooperated, whereby the light cannot pass through the align mark, then a visual system can captures an image, and finally the phase retarder substrate can be aligned with and attached to the liquid crystal display panel. However, the disadvantage of the design of the align mark of the phase retarder substrate is that the align mark is requested to add the reflection layer and further the reflection layer is formed by an additional photo-mask process so as to increase the cost.

Furthermore, referring to FIG. 1, a light source 52 and an image capturing unit 54 of a visual system CAM must be located at the same side. After the light source 52 emits a light to a phase retarder substrate align mark 50, the image capturing unit 54 captures an image of the reflected light. At that moment, there is a reflected angle θ to greatly affect the precision of aligning and attaching the liquid crystal display panel and the phase retarder substrate. Generally, the necessary precision of aligning and attaching the liquid crystal display panel and the phase retarder substrate must be a few micrometers. Thus, if a reflective type method for aligning and attaching the liquid crystal display panel and the phase retarder substrate is used, the precision of aligning and attaching the liquid crystal display panel and the phase retarder substrate is easily affected by the reflected angle.

Accordingly, there exists a need for an aligning/attaching system for a 3D image display device capable of solving the above-mentioned problems.

SUMMARY OF THE INVENTION

This invention provides a method for positioning a phase retarder substrate comprising the following steps of: providing a phase retarder substrate comprising a first align mark which comprises a patterned phase retarder film; disposing an image capturing unit at one side of the phase retarder substrate; disposing a light source at the other side of the phase retarder substrate; disposing an upper polarizing sheet between the image capturing unit and the patterned phase retarder film, and disposing a lower polarizing sheet between the light source and the patterned phase retarder film; and emitting a light to the patterned phase retarder film by the light source, and then capturing an image of the light which passes through the lower polarizing sheet, the patterned phase retarder film and the upper polarizing sheet by the image capturing unit so as to position the phase retarder substrate.

This invention further provides an aligning/attaching system for a 3D image display device, the 3D image display device comprising a phase retarder substrate and a display panel, the phase retarder substrate comprising a first align mark which comprises a patterned phase retarder film, the display panel comprising a second align mark, the aligning/attaching system comprising: an image capturing unit disposed at one side of the phase retarder substrate; a light source disposed at the other side of the phase retarder substrate, wherein the display panel is located between the phase retarder substrate and the light source; an upper polarizing sheet disposed between the image capturing unit and the patterned phase retarder film, and a lower polarizing sheet disposed between the light source and the patterned phase retarder film, whereby a light is emitted to the patterned phase retarder film of the first align mark by the light source, and then an image of the light which passes through the lower polarizing sheet, the patterned phase retarder film and the upper polarizing sheet is captured by the image capturing unit so as to position the phase retarder substrate; and a light is emitted to the second align mark by the light sources, and then an image of the light which passes through the lower polarizing sheet, the second align mark, the patterned phase retarder film and the upper polarizing sheet is captured by the image capturing units; an aligning/analyzing module used for analyzing the images of the first align mark and the second align mark; and an attaching/controlling module is used for attaching the phase retarder substrate to the display panel.

The design of the first align mark of the present invention is not requested to add a reflection layer, and further no reflection layer is formed by an additional photo-mask process so as not to increase the cost. Furthermore, the light source and the image capturing unit are located at different sides. After the light source emits a light to the first align mark, the image capturing unit captures an image of the transmitted light. At that moment, there is no reflected angle so as not to affect the precision of aligning and attaching the display panel and the phase retarder substrate. Thus, according to the transmissive type aligning/attaching method of the present invention, the precision of alignment and attachment is not affected by the reflected angle. Furthermore, the precision of alignment and attachment of the transmissive type aligning/attaching method of the present invention is much better than that of the conventional reflective type aligning/attaching method.

In order to make the aforementioned and other objectives, features and advantages of the present invention comprehensible, embodiments are described in detail below with reference to the accompanying drawings.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1:
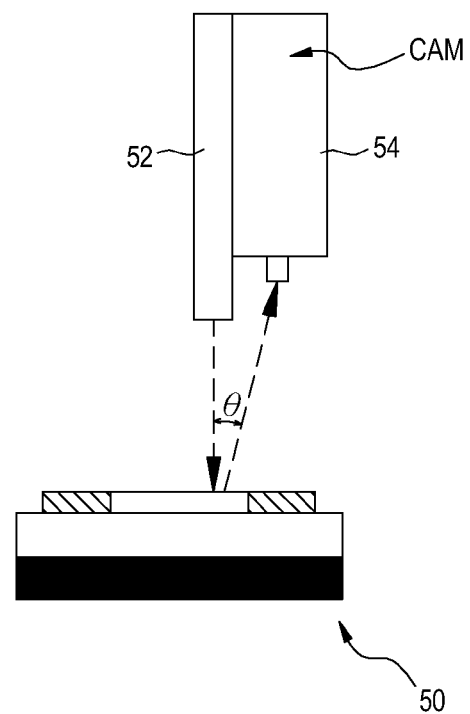
FIG. 1 is a cross sectional view of a light source and a visual system of a conventional positioning system for a conventional 3D image display device, showing a basic structure.
Figure 2A:
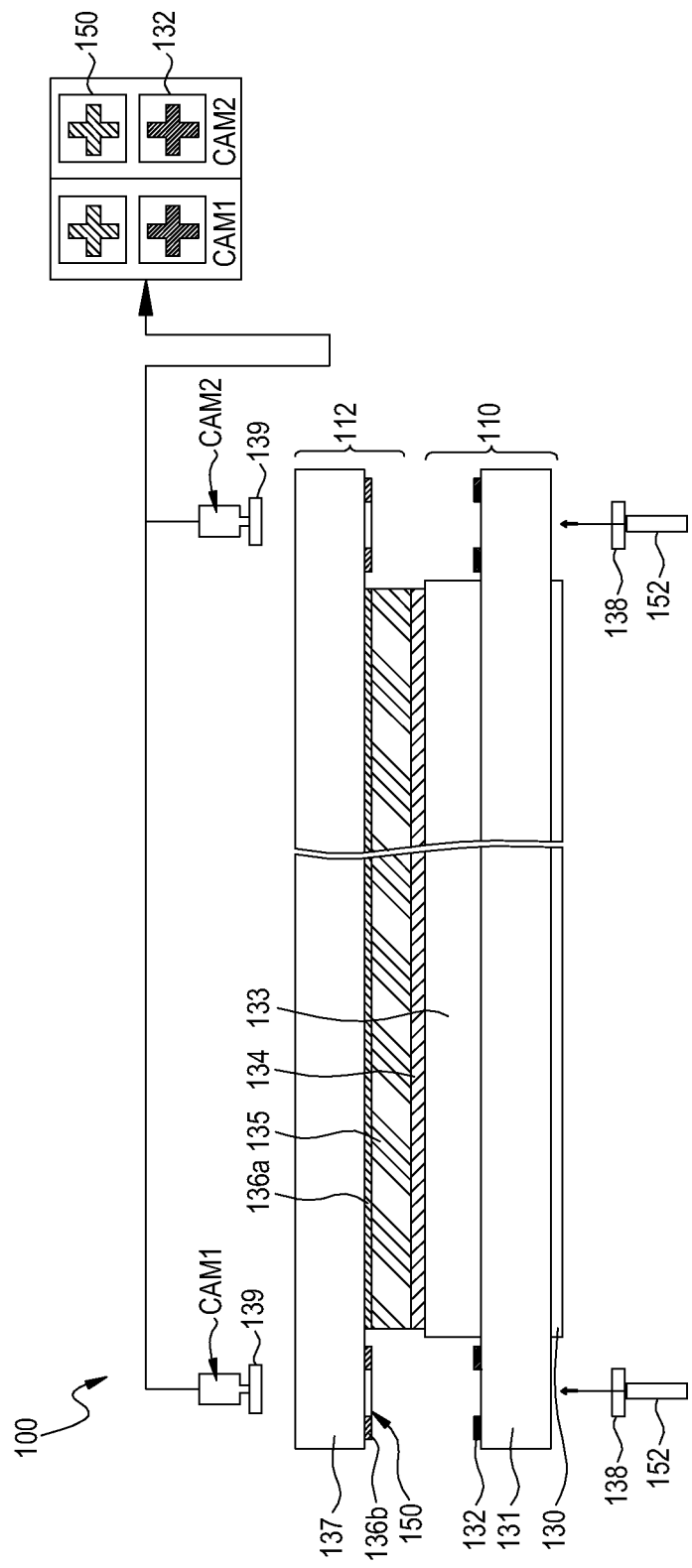
FIGS. 2a and 2b are cross sectional views of aligning/attaching systems for a 3D image display device according to an embodiment of the present invention.
Figure 2B:
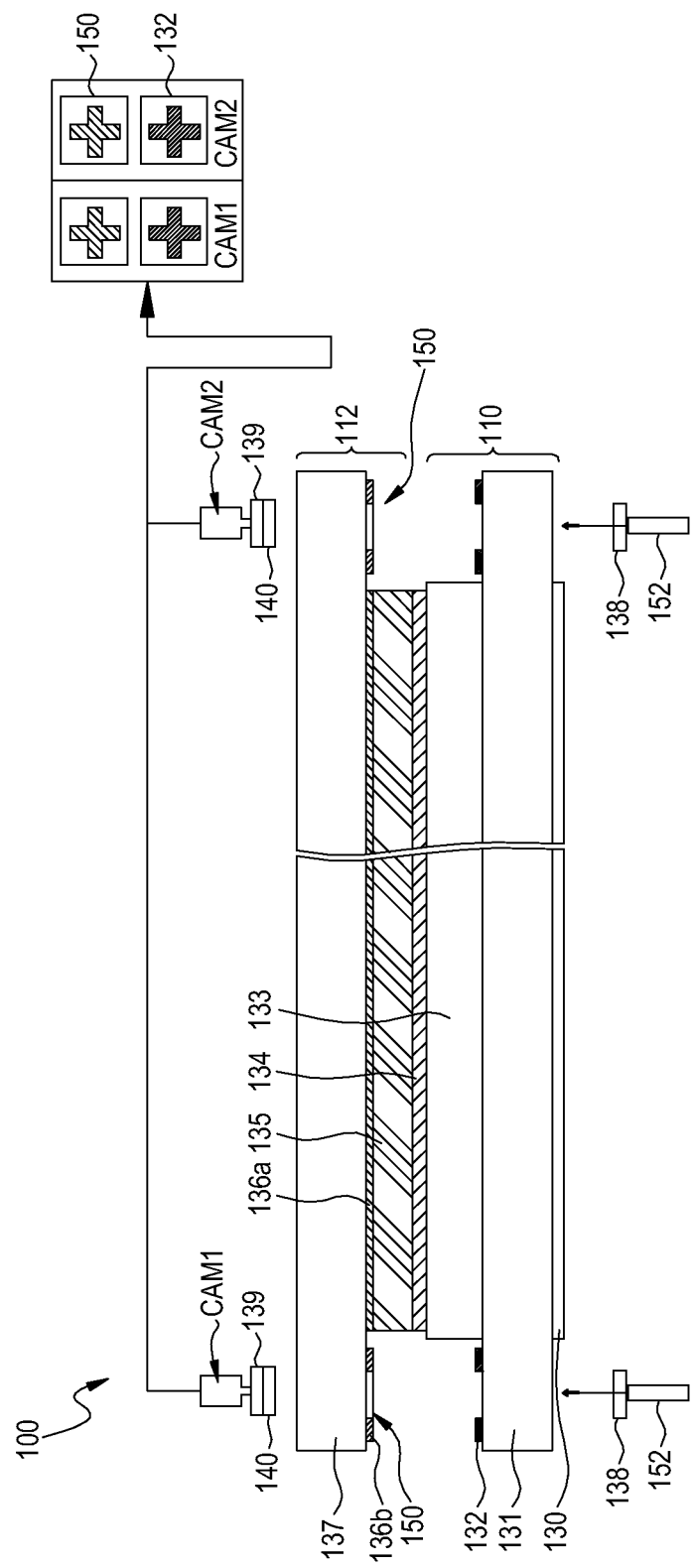

FIGS. 2a and 2b are cross sectional views of aligning/attaching systems 100 for a 3D image display device according to an embodiment of the present invention, showing a basic structure. The difference between the aligning/attaching systems 100 shown in FIGS. 2a and 2b is that an image capturing unit of the aligning/attaching system 100 shown in FIG. 2b further includes a phase retarder film 140. In this embodiment, the 3D image display device includes a phase retarder substrate 112 and a display panel 110. The phase retarder substrate 112 includes a transparent substrate 137, a phase retarder film 136a and a first align mark 150. The phase retarder film 136a is used for transforming an image viewed by a left eye to a first polarized light, and transforming an image viewed by a right eye to a second polarized light. The first align mark 150 includes a patterned phase retarder film 136b. The patterned phase retarder film 136b is formed on a border of the transparent substrate 137 of the phase retarder substrate 112. The display panel 110 includes an upper polarizing sheet 134, a color filter substrate 133, a thin film transistor substrate 131 and a lower polarizing sheet 130 for showing an image viewed by the left eye and an image viewed by the right eye. The display panel 110 further includes a second align mark 132, wherein the second align mark 132 is located on a border of the display panel 110.

The aligning/attaching system 100 includes at least one image capturing unit CAM1, CAM2, at least one light source 152, at least one upper polarizing sheet 139 and at least one lower polarizing sheet 138. In this embodiment, for example, two image capturing units CAM1, CAM2, two light sources 152, two upper polarizing sheets 139 and two lower polarizing sheets 138 are described as follows. The image capturing units CAM1, CAM2 are disposed at one side of the phase retarder substrate 112. The light sources 152 disposed at the other side of the phase retarder substrate 112, wherein the display panel 110 is located between the phase retarder substrate 112 and the light sources 152. The upper polarizing sheet 139 is disposed between the image capturing unit CAM1, CAM2 and the patterned phase retarder film 136b, and the lower polarizing sheet 138 is disposed between the light sources 152 and the patterned phase retarder film 136b. A light is emitted to the patterned phase retarder films 136b of the first align mark 150 by the light sources 152, and then an image of the light which passes through the lower polarizing sheet 138, the patterned phase retarder film 136b and the upper polarizing sheet 139 is captured by the image capturing units CAM1, CAM2 so as to position the phase retarder substrate 112. Furthermore, a light is emitted to the second align mark 132 by the light sources 152, and then an image of the light which passes through the lower polarizing sheet 138, the second align mark 132, the patterned phase retarder film 136b and the upper polarizing sheet 139 is captured by the image capturing units CAM1, CAM2.

Figure 3:
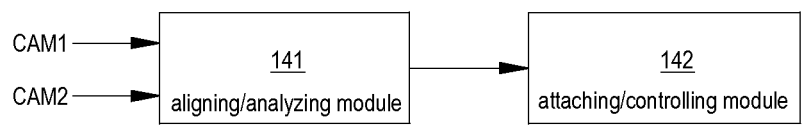
FIG. 3 is a block diagram of an aligning/analyzing module and an attaching/controlling module of the aligning/attaching system for a 3D image display device according to an embodiment of the present invention, showing a basic structure.
Figure 4:
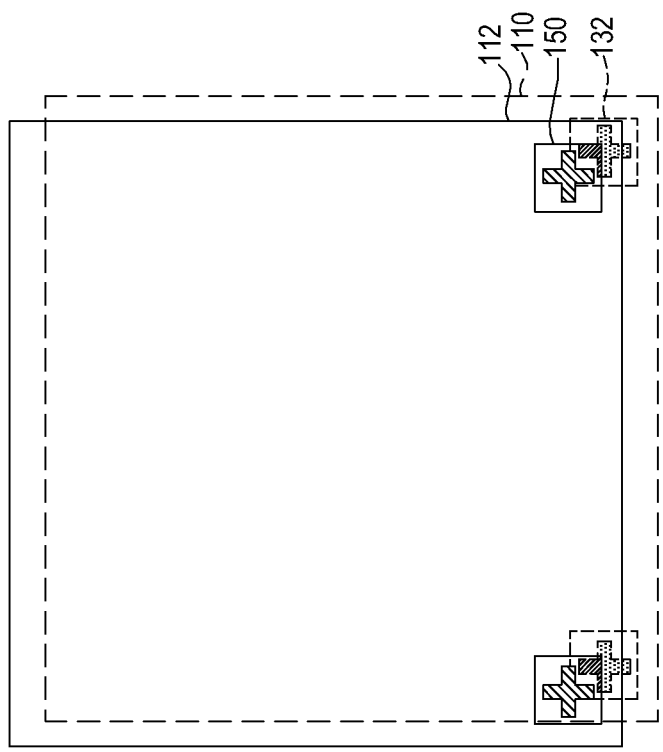
FIG. 4 a schematic view showing the locations of images of a first align mark and a second align mark of the present invention.

Referring FIGS. 3 and 4 simultaneously, the aligning/attaching system 100 further includes an aligning/analyzing module 141 and an attaching/controlling module 142. The aligning/analyzing module 141 is used for analyzing the images of the first align mark 150 and the second align mark 132. The attaching/controlling module 142 is used for attaching the phase retarder substrate 112 to the display panel 110. The aligning/analyzing module 141 can include an image analyzing unit used for analyzing the locations of the images of the first align mark 150 and the second align mark 132. The attaching/controlling module 142 can include a microcontroller and an aligning/driving unit used for driving the phase retarder substrate 112 and the display panel 110, superimposing the image of the first align mark 150 with the image of the second align mark 132, and attaching the phase retarder substrate 112 to the display panel 110 by an optical adhesive 135 (shown in FIG. 2a).

Figure 5:
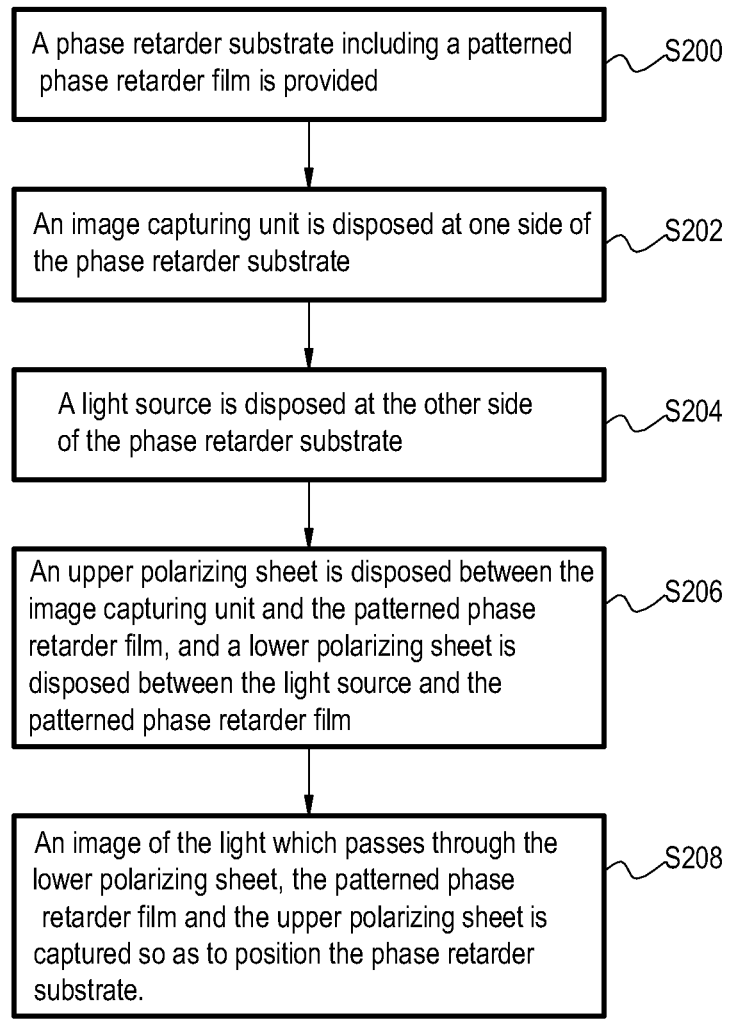
FIG. 5 is a flow chart showing a method for positioning a phase retarder substrate according to an embodiment of the present invention.

Referring to FIG. 5, it depicts a flow chart showing a method for positioning a phase retarder substrate of the present invention. In the step S200, a phase retarder substrate is provided, wherein the phase retarder substrate includes a first align mark which includes a patterned phase retarder film. In the step S202, an image capturing unit is disposed at one side of the phase retarder substrate. In the step S204, a light source is disposed at the other side of the phase retarder substrate. In the step S206, an upper polarizing sheet is disposed between the image capturing unit and the patterned phase retarder film, and a lower polarizing sheet is disposed between the light source and the patterned phase retarder film. In the step S208, a light is emitted to the patterned phase retarder film by the light source, and then an image of the light which passes through the lower polarizing sheet, the patterned phase retarder film and the upper polarizing sheet is captured so as to position the phase retarder substrate.

Figure 6A:
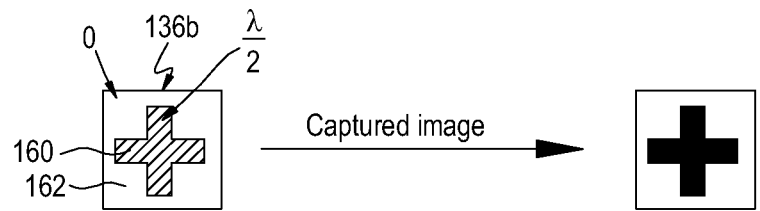
FIG. 6a shows the patterned phase retarder film and the captured image according to a first example of the present invention.
Figure 6B:
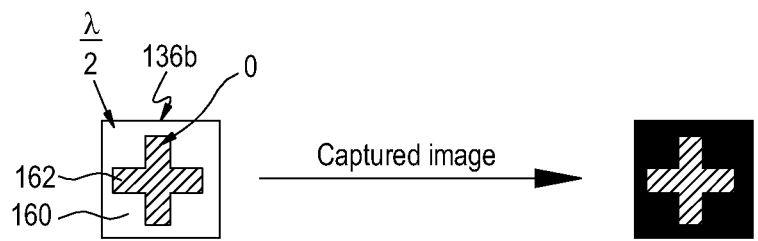
FIG. 6b shows the patterned phase retarder film and the captured image according to another example of the present invention.

FIGS. 6a and 6b show the patterned phase retarder films and the captured images of the present invention. Referring FIGS. 2a and 6a again, in the first example, the patterned phase retarder film 136b includes a first region 160 and a second region 162 adjacent to the first region 160. The first region 160 has a half-wavelength retardation ($½λ$), and the second region 162 has no retardation. After the light of the light source 152 passes through the lower polarizing sheet 138, the light of the light source 152 is transformed to a polarized light. When the polarized light which has passed through the first region 160, there are 90 degrees between the polarization direction of the passing light and the transmission axis of the upper polarizing sheet 139 (i.e., the polarization direction of the polarized light is perpendicular to the transmission axis of the upper polarizing sheet 139), and then the polarized light is fully sheltered by the upper polarizing sheet 139 so as to show a black region; and when the polarized light which has passed through the second region 162, there is zero degree between the polarization direction of the passing light and the transmission axis of the upper polarizing sheet 139 (i.e., the polarization direction of the polarized light is parallel to the transmission axis of the upper polarizing sheet 139), and then the polarized light is not sheltered by the upper polarizing sheet 139 so as not to show a black region. At that moment, the second region 162 surrounds the first region 160. The upper polarizing sheet 139 can be a linear polarizing sheet of 45 degrees. Referring FIG. 6*b* again, in another example, the first region 160 surrounds the second region 162. The light of the light source 152 can firstly pass through the lower polarizing sheet 138 and the first region 160, but then cannot pass through the upper polarizing sheet 139. Thus, the light of the light source 152 is fully sheltered by the upper polarizing sheet 139 so as to show a black region. Furthermore, the light of the light source 152 can firstly pass through the lower polarizing sheet 138 and the second region 162, and then can pass through the upper polarizing sheet 139. Thus, the light of the light source 152 cannot be sheltered by the upper polarizing sheet 139 so as not to show a black region.

Figure 7A:
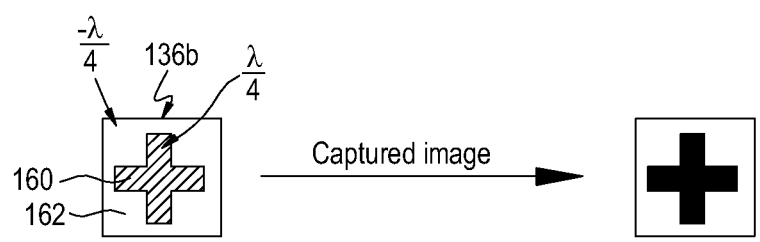
FIG. 7a shows the patterned phase retarder film and the captured image according to a second example of the present invention.
Figure 7B:
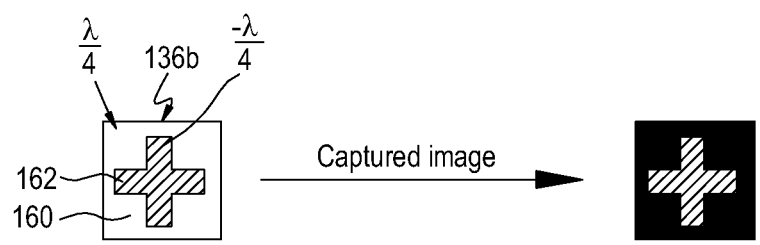
FIG. 7b shows the patterned phase retarder film and the captured image according to another example of the present invention.

Referring FIGS. 2*b* and 7*a*, in the second example, a phase retarder film 140 is disposed between the image capturing units CAM1, CAM2 and the patterned phase retarder film 136*b*. The patterned phase retarder film 136*b* includes a first region 160 and a second region 162 adjacent to the first region 160. The first region 160 has positive quarter-wavelength retardation (+¼λ), the second region 162 has negative quarter-wavelength retardation (−¼λ), and the phase retarder film 140 has positive quarter-wavelength retardation (+¼λ). After the light of the light source 152 passes through the lower polarizing sheet 138, the light of the light source 152 is transformed to a polarized light. When the polarized light which has passed through the first region 160 and the phase retarder film 140, there are 90 degrees between the polarization direction of the passing light and the transmission axis of the upper polarizing sheet 139 (i.e., the polarization direction of the polarized light is perpendicular to the transmission axis of the upper polarizing sheet 139), and then the polarized light is fully sheltered by the upper polarizing sheet 139 so as to show a black region; and when the polarized light which has passed through the second region 162 and the phase retarder film 140, there is zero degree between the polarization direction of the passing light and the transmission axis of the upper polarizing sheet 139 (i.e., the polarization direction of the polarized light is parallel to the transmission axis of the upper polarizing sheet 139), and then the polarized light is not sheltered by the upper polarizing sheet 139 so as not to show a black region. At that moment, the second region 162 surrounds the first region 160. The upper polarizing sheet 139 can be a linear polarizing sheet of 45 degrees. Referring FIG. 7*b* again, in another example, the first region 160 surrounds the second region 162. The light of the light source 152 can firstly pass through the lower polarizing sheet 138, the first region 160 and the phase retarder film 140, but then cannot pass through the upper polarizing sheet 139. Thus, the light of the light source 152 is fully sheltered by the upper polarizing sheet 139 so as to show a black region. Furthermore, the light of the light source 152 can firstly pass through the lower polarizing sheet 138, the second region 162 and the phase retarder film 140, and then can pass through the upper polarizing sheet 139. Thus, the light of the light source 152 cannot be sheltered by the upper polarizing sheet 139 so as not to show a black region.

Figure 8A:
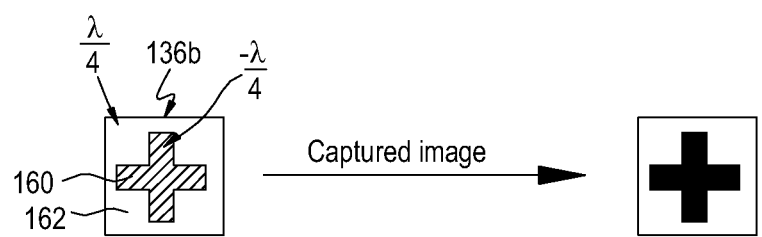
FIG. 8a shows the patterned phase retarder film and the captured image according to a third example of the present invention.
Figure 8B:
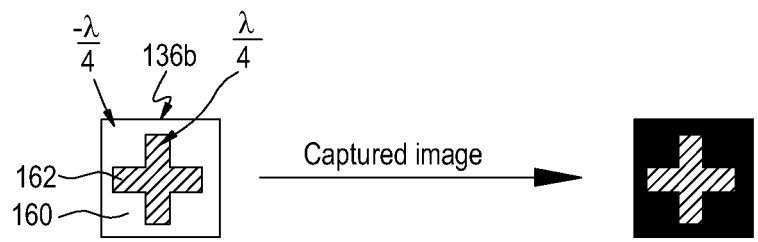
FIG. 8b shows the patterned phase retarder film and the captured image according to another example of the present invention.

Referring FIGS. 2*b* and 8*a*, in the third example, a phase retarder film 140 is disposed between the image capturing units CAM1, CAM2 and the patterned phase retarder film 136*b*. The patterned phase retarder film 136*b* includes a first region 160 and a second region 162 adjacent to the first region 160. The first region 160 has negative quarter-wavelength retardation (−¼λ), the second region 162 has positive quarter-wavelength retardation (+¼λ), and the phase retarder film 140 has negative quarter-wavelength retardation (−¼λ). After the light of the light source 152 passes through the lower polarizing sheet 138, the light of the light source 152 is transformed to a polarized light. When the polarized light which has passed through the first region 160 and the phase retarder film 140, there are 90 degrees between the polarization direction of the passing light and the transmission axis of the upper polarizing sheet 139 (i.e., the polarization direction of the polarized light is perpendicular to the transmission axis of the upper polarizing sheet 139), and then the polarized light is fully sheltered by the upper polarizing sheet 139 so as to show a black region; and when the polarized light which has passed through the second region 162 and the phase retarder film 140, there is zero degree between the polarization direction of the passing light and the transmission axis of the upper polarizing sheet 139 (i.e., the polarization direction of the polarized light is parallel to the transmission axis of the upper polarizing sheet 139), and then the polarized light is not sheltered by the upper polarizing sheet 139 so as not to show a black region. At that moment, the second region 162 surrounds the first region 160. The upper polarizing sheet 139 can be a linear polarizing sheet of 135 degrees. Referring FIG. 8*b* again, in another example, the first region 160 surrounds the second region 162. The light of the light source 152 can firstly pass through the lower polarizing sheet 138, the first region 160 and the phase retarder film 140, but then cannot pass through the upper polarizing sheet 139. Thus, the light of the light source 152 is fully sheltered by the upper polarizing sheet 139 so as to show a black region. Furthermore, the light of the light source 152 can firstly pass through the lower polarizing sheet 138, the second region 162 and the phase retarder film 140, and then can pass through the upper polarizing sheet 139. Thus, the light of the light source 152 cannot be sheltered by the upper polarizing sheet 139 so as not to show a black region.

Figure 9:
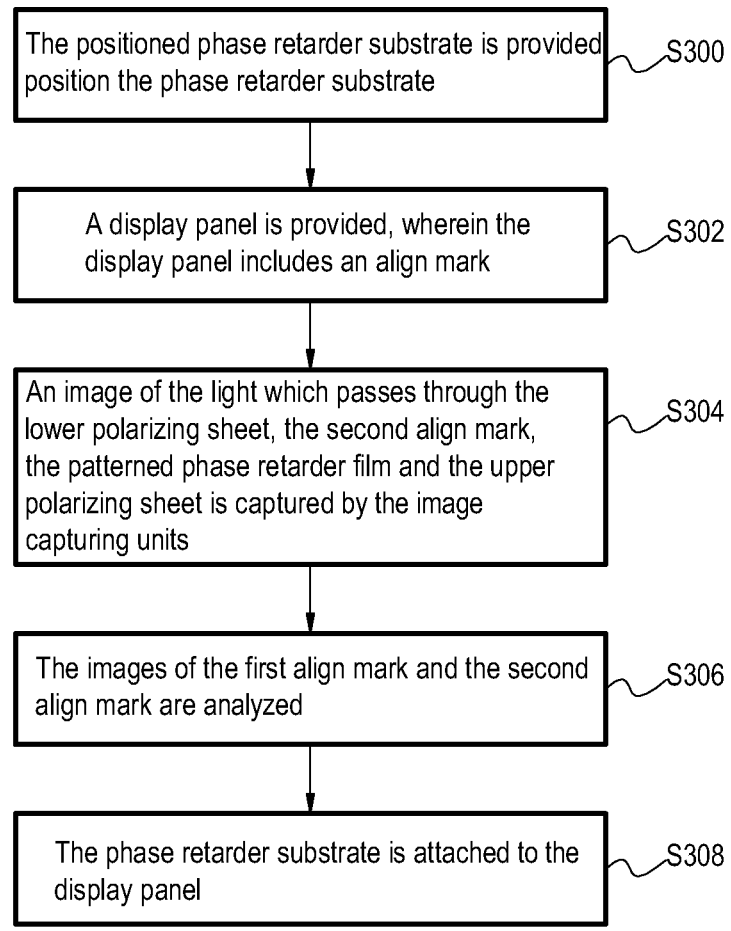
FIG. 9 is a flow chart of an aligning/attaching method for a 3D image display device according to an embodiment of the present invention.

Referring to FIG. 9, it depicts a flow chart of an aligning/attaching method for a 3D image display device according to an embodiment of the present invention. In the step S300, the positioned phase retarder substrate is provided. In the step S302, a display panel is provided, wherein the display panel is located between the phase retarder substrate and the light source, and includes a second align mark. In the step S304, a light is emitted to the second align mark by the light sources, and then an image of the light which passes through the lower polarizing sheet, the second align mark, the patterned phase retarder film and the upper polarizing sheet is captured by the image capturing units. In the step S306, the images of the first align mark and the second align mark are analyzed. In the step S308, the phase retarder substrate is attached to the display panel.

The design of the first align mark of the present invention is not requested to add a reflection layer, and further no reflection layer is formed by an additional photo-mask process so as not to increase the cost. Furthermore, the light source and the image capturing unit are located at different sides. After the light source emits a light to the first align mark, the image capturing unit captures an image of the transmitted light. At that moment, there is no reflected angle so as not to affect the precision of aligning and attaching the display panel and the phase retarder substrate. Thus, according to the transmissive type aligning/attaching method of the present invention, the precision of alignment and attachment is not affected by the reflected angle. Furthermore, the precision of alignment and attachment of the transmissive type aligning/attaching method of the present invention is much better than that of the conventional reflective type aligning/attaching method.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for positioning a phase retarder substrate comprising the following steps of:
   providing a phase retarder substrate comprising a first align mark which comprises a patterned phase retarder film;
   disposing an image capturing unit at one side of the phase retarder substrate;
   disposing a light source at the other side of the phase retarder substrate;
   disposing an upper polarizing sheet between the image capturing unit and the patterned phase retarder film, and disposing a lower polarizing sheet between the light source and the patterned phase retarder film; and
   emitting a light to the patterned phase retarder film by the light source, and then capturing an image of the light which passes through the lower polarizing sheet, the patterned phase retarder film and the upper polarizing sheet by the image capturing unit so as to position the phase retarder substrate.

2. The method as claimed in claim 1, wherein the patterned phase retarder film comprises a first region and a second region adjacent to the first region, the first region has a half-wavelength retardation ($½λ$), and the second region has no retardation, whereby when the light of the light source which has passed through the lower polarizing sheet and the first region, there are 90 degrees between the polarization direction of the passing light and the transmission axis of the upper polarizing sheet; and when the light of the light source which has passed through the lower polarizing sheet and the second region, there is zero degree between the polarization direction of the passing light and the transmission axis of the upper polarizing sheet.

3. The method as claimed in claim 2, wherein the second region surrounds the first region, or the first region surrounds the second region.

4. The method as claimed in claim 1, further comprising the following step of:
   disposing a phase retarder film between the image capturing unit and the patterned phase retarder film.

5. The method as claimed in claim 4, wherein the patterned phase retarder film comprises a first region and a second region adjacent to the first region, the first region has positive quarter-wavelength retardation ($+¼λ$), the second region has negative quarter-wavelength retardation ($-¼λ$), and the phase retarder film has positive quarter-wavelength retardation ($+¼λ$), whereby when the light of the light source which has passed through the lower polarizing sheet, the first region and the phase retarder film, there are 90 degrees between the polarization direction of the passing light and the transmission axis of the upper polarizing sheet; and when the light of the light source which has passed through the lower polarizing sheet, the second region and the phase retarder film, there is zero degree between the polarization direction of the passing light and the transmission axis of the upper polarizing sheet.

6. The method as claimed in claim 5, wherein the second region surrounds the first region, or the first region surrounds the second region.

7. The method as claimed in claim 4, wherein the patterned phase retarder film comprises a first region and a second region adjacent to the first region, the first region has negative quarter-wavelength retardation ($-¼λ$), the second region has positive quarter-wavelength retardation ($+¼λ$), and the phase retarder film has negative quarter-wavelength retardation ($-¼λ$), whereby when the light of the light source which has passed through the lower polarizing sheet, the first region and the phase retarder film, there are 90 degrees between the polarization direction of the passing light and the transmission axis of the upper polarizing sheet; and when the light of the light source which has passed through the lower polarizing sheet, the second region and the phase retarder film, there is zero degree between the polarization direction of the passing light and the transmission axis of the upper polarizing sheet.

8. The method as claimed in claim 7, wherein the second region surrounds the first region, or the first region surrounds the second region.

9. An aligning/attaching system for a 3D image display device, the 3D image display device comprising a phase retarder substrate and a display panel, the phase retarder substrate comprising a first align mark which comprises a patterned phase retarder film, the display panel comprising a second align mark, the aligning/attaching system comprising:
   an image capturing unit disposed at one side of the phase retarder substrate;
   a light source disposed at the other side of the phase retarder substrate, wherein the display panel is located between the phase retarder substrate and the light source;
   an upper polarizing sheet disposed between the image capturing unit and the patterned phase retarder film, and a lower polarizing sheet disposed between the light source and the patterned phase retarder film, whereby a light is emitted to the patterned phase retarder film of the first align mark by the light source, and then an image of the light which passes through the lower polarizing sheet, the patterned phase retarder film and the upper polarizing sheet is captured by the image capturing unit so as to position the phase retarder substrate; and a light is emitted to the second align mark by the light sources, and then an image of the light which passes through the lower polarizing sheet, the second align mark, the patterned phase retarder film and the upper polarizing sheet is captured by the image capturing units;
   an aligning/analyzing module used for analyzing the images of the first align mark and the second align mark; and
   an attaching/controlling module is used for attaching the phase retarder substrate to the display panel.

10. The aligning/attaching system as claimed in claim 9, further comprising:
   a phase retarder film disposed between the image capturing unit and the patterned phase retarder film.

* * * * *